S. P. Heintzelman.
Life Preserver.
Nº 18,691.        Patented Nov. 24, 1857.
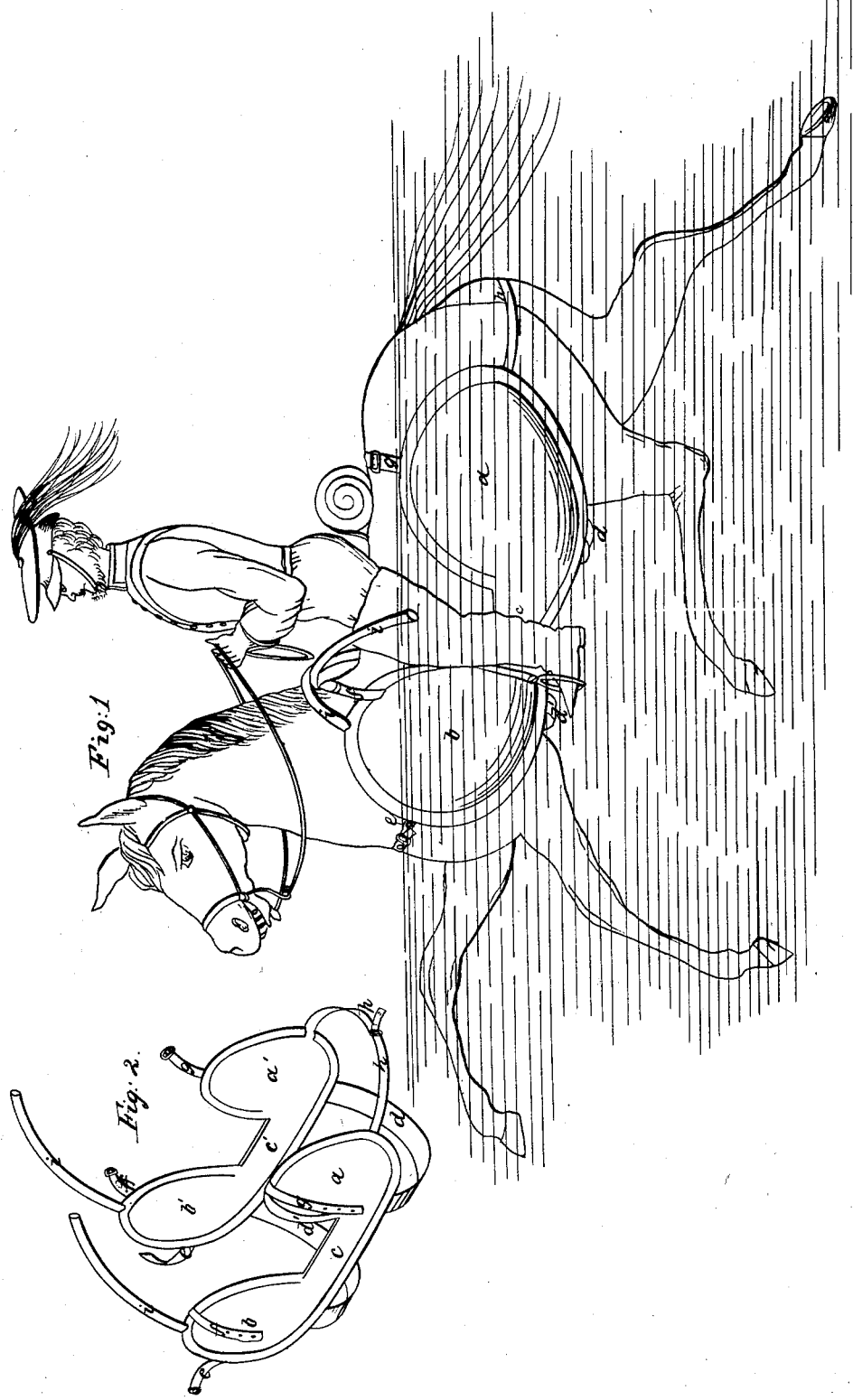

UNITED STATES PATENT OFFICE.

SAMUEL P. HEINTZELMAN, OF NEWPORT BARRACKS, KENTUCKY.

IMPROVEMENT IN METHODS OF FLOATING HORSES, &c., ACROSS RIVERS.

Specification forming part of Letters Patent No. 18,691, dated November 24, 1857.

*To all whom it may concern:*

Be it known that I, SAMUEL P. HEINTZELMAN, of Newport Barracks, Campbell county, and State of Kentucky, have invented a new and useful Mode of Floating Horses and other Animals Across Streams of Water, and called by me "the Cavalry Float;" and I do hereby declare the following to be a full, clear, and exact description thereof, reference being had to the annexed drawings, making part of this specification.

During a long service on the frontier, where ferries are few, the necessity for some means more portable than boats for crossing the men and animals suggested itself. The want thereof often proves the source of much delay and loss, frequently the delay thus encountered in pursuing Indians being such as to make any further progress useless. Especially has this been experienced on the Pecos, in Texas, the Rio Grande, the Colorado and its tributaries, and on the Columbia and its tributaries.

In the accompanying drawings, Figure 1 represents a mounted horseman whose animal is equipped with a suit of my floats. Fig. 2 represents a suit of floats detached.

My floats consist, mainly, of a pair of bags of gutta-percha, india-rubber, or other suitable substance $a\ b\ c\ a'\ b'\ c'$, each of the peculiar double-lobed form, substantially as represented, the two lobes $a\ b\ a'\ b'$ of each respective bag communicating interiorly by a small duct $c\ c'$. The two bags are united together by means of two girths $d\ d'$, one $d$ being intended to pass under the horse's belly a little behind the fore legs and the other a little in front of the hind legs. There are also straps $e\ f\ g\ h$, which pass, respectively, in front of the breast, over the wethers, and over the rump, and behind the hams, and are secured either by buckles, as represented, or in some other convenient manner. $i$ are tubes through which the bags may be inflated by the breath, the air thus introduced being secured by valves in any approved way. A squadron of cavalry thus equipped, the men having waterproof pantaloons with feet, can cross rivers, lakes, or estuaries dry-shod without the aid of boats, and by attaching my cavalry-floats to animals in harness, the wagons having the Stanton floats or being formed of corrugated iron, like Francis's, such as are now used in the army, they can pass over in the same way. Moreover, by having the floats of sufficient size each horseman could take over with him another man. Thus in a campaign such floats would be invaluable, as with their aid cavalry, with an infantry soldier behind each man, and light artillery could be crossed over rivers at unexpected points and with great expedition, and by this means prevent an enemy providing means of resistance.

For emigrants in crossing the continent to California or Oregon, where numerous rivers are met with whose fords are doubtful or far asunder, a few such floats would prevent delay and the serious loss sometimes sustained by using the precarious alternative of rafts.

All frontiersmen could relate instances in their own experience where such facilities would have proved invaluable.

I claim as new and of my invention herein—

The specific form of cavalry-float herein described, consisting, mainly, of a pair of bags connected by girths and provided with the described fastening-straps, the bags having each the form of two lobes connected by a duct and being provided with suitable inflation-tubes, as represented, or equivalent devices, for the purposes explained.

In testimony whereof I hereunto set my hand before two subscribing witnesses.

S. P. HEINTZELMAN.

Witnesses:
   JAS. D. GRIDLEY,
   GEO. H. KNIGHT.